(12) United States Patent  (10) Patent No.: US 7,077,392 B2
Siegel et al.  (45) Date of Patent: Jul. 18, 2006

(54) FOOD CUTTING BOARD WITH A SLOPING TROUGH SLIDE

(75) Inventors: Jeffrey Siegel, Kings Point, NY (US); Adam Krent, Brooklyn, NY (US)

(73) Assignee: Lifetime Hoan Corporation, Westbury, NY (US)

( * ) Notice: Subject to any disclaimer, the term of this patent is extended or adjusted under 35 U.S.C. 154(b) by 0 days.

(21) Appl. No.: 10/803,547

(22) Filed: Mar. 18, 2004

(65) Prior Publication Data

US 2005/0206060 A1    Sep. 22, 2005

(51) Int. Cl.
*B23Q 3/00* (2006.01)

(52) U.S. Cl. .............................. 269/302.1; 269/289 R

(58) Field of Classification Search ............ 269/289 R, 269/302.1, 901, 13, 15
See application file for complete search history.

(56) References Cited

U.S. PATENT DOCUMENTS

| 120,394 | A | * | 10/1871 | Petterson ................. 269/302.1 |
| 2,609,024 | A | | 9/1952 | Massillon |
| 2,868,145 | A | * | 1/1959 | Brooke ....................... 249/158 |
| 4,100,676 | A | * | 7/1978 | Ferguson ..................... 30/292 |
| 4,440,385 | A | | 4/1984 | Kingery |
| 4,447,051 | A | | 5/1984 | Price |
| 4,907,789 | A | | 3/1990 | Tice |
| 5,085,416 | A | | 2/1992 | Miyake et al. |
| 5,386,978 | A | | 2/1995 | Ladwig |
| 5,527,022 | A | * | 6/1996 | Gibson ........................ 269/13 |
| 5,984,294 | A | | 11/1999 | Bogomolny |
| 5,996,983 | A | | 12/1999 | Laurenzi |
| 6,341,770 | B1 | * | 1/2002 | Landherr ................ 269/289 R |
| 6,371,470 | B1 | | 4/2002 | Ward |
| 6,386,531 | B1 | | 5/2002 | Prosser |
| 6,478,292 | B1 | | 11/2002 | Sellers |
| 6,536,753 | B1 | | 3/2003 | Keener |
| 6,622,998 | B1 | | 9/2003 | Wong |
| 6,644,639 | B1 | | 11/2003 | Newton |
| 6,651,970 | B1 | | 11/2003 | Scott |
| 6,663,096 | B1 | | 12/2003 | Heath et al. |

FOREIGN PATENT DOCUMENTS

CH             665109 A5 *   4/1988

* cited by examiner

*Primary Examiner*—Lee D. Wilson
(74) *Attorney, Agent, or Firm*—Jenkens & Gilchrist, P.C.

(57) ABSTRACT

A cutting board for chopping food articles and household items includes a baseboard having a cutting surface for cutting articles thereon. The cutting board further includes a smooth curved sloping surface region at one edge. A surface of the smooth curved sloping surface region has a texture which is different from a texture of the cutting surface. The smooth curved sloping surface region enhances the transfer of chopped articles from the cutting surface to another location.

30 Claims, 3 Drawing Sheets

FOOD CUTTING BOARD WITH A SLOPING TROUGH SLIDE

BACKGROUND OF THE INVENTION

1. Technical Field of the Invention

The present invention relates in general to cutting boards and more specifically to cutting boards used for chopping food articles, household items and other material. In particular, the present invention relates to a food cutting board having a sloping trough slide at one edge of the cutting board for transferring chopped articles from the cutting board to a desired location.

2. Description of Related Art

Cutting boards are well known in the art and are primarily designed to provide a cutting surface on which to cut food and other materials while protecting a countertop. Cutting food articles and other material is a potentially dangerous task, i.e., using a sharp knife or cleaver under pressure against often times frozen, hard or cumbersome articles. Any slippage or shifting of the article during the cutting process may cause severe injury to the person involved in the cutting process.

Fluid seeping from articles during the cutting process promotes the slippage and shifting of articles creating an unsafe environment. Hence, cutting boards generally possess non-slip characteristics on the cutting surface which help to engage and retain cut articles. However, providing the non-slip characteristics over the entire cutting surface may be inconvenient in some instances because such a surface provides resistance to the transfer of chopped articles from the cutting surface of the cutting board to a desired location.

None of the prevalent prior art cutting boards provide an effective means for both engaging and retaining chopped articles and facilitating the transfer of chopped articles from the cutting surface of the cutting board in an efficient manner with minimum resistance.

Therefore, there is a need not only for a cutting board which enhances support of chopped articles over the cutting surface, but also includes a feature that provides an easy and more efficient way of transferring chopped articles from the cutting surface of the cutting board.

SUMMARY OF THE INVENTION

A cutting board for chopping food articles and household items includes a baseboard having a cutting surface for chopping articles. The cutting board further includes a sloping trough slide defined in the cutting surface at an edge of the baseboard. The sloping trough slide has a concave, continuous arch shape that decreases in depth as the slide extends in from the edge.

In another embodiment of the invention, the cutting board further comprises a spout region at an edge of the cutting board to assist in extending a reach of the sloping trough slide. The sloping trough slide has a concave, continuous arch shape that decreases in depth as the slide extends in through the spout region.

In yet another embodiment of the invention, the cutting board further comprises a cross-sectionally smooth sloping trough defined in the cutting surface extending in from an edge of the baseboard.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
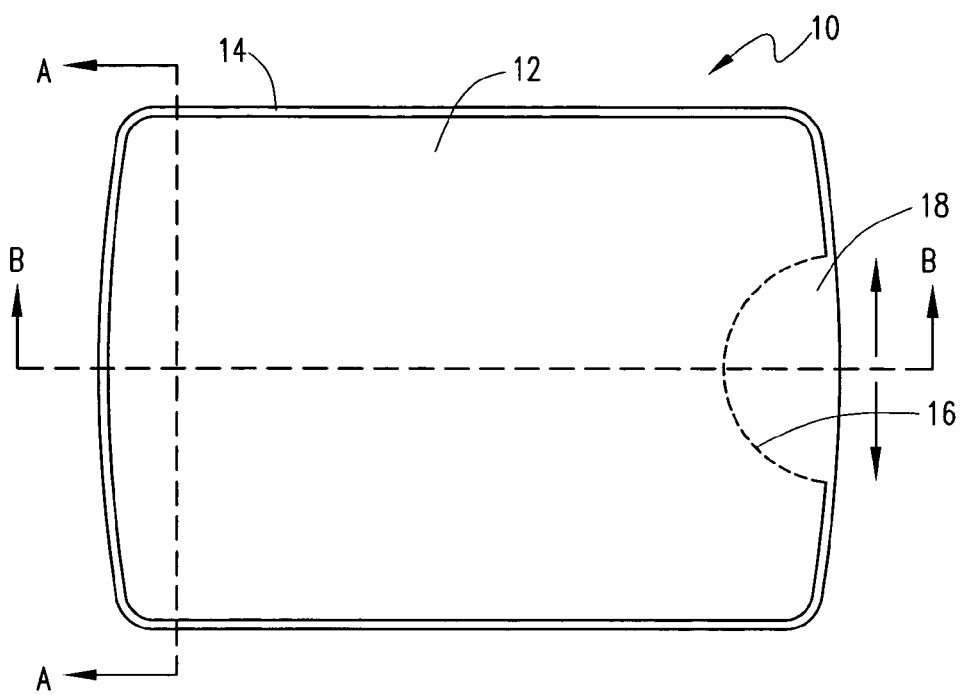
FIG. 1 is a top surface view of the cutting board in accordance with the present invention.

With reference now to the drawings, and in particular to FIGS. 1–8 thereof, a novel cutting board embodying the principles and concepts of the present invention and generally designated by the reference numeral 10 will be described. While the embodiments described herein are intended as an exemplary cutting board for cutting food articles, it will be appreciated by those skilled in the art that the present invention is not limited for cutting food articles, and may be employed for cutting other household items.

Referring now to FIGS. 1–5, a first embodiment of the cutting board of the present invention will be described in detail.

The cutting board 10 includes a baseboard 12, having a durable, rigid, continuous, flat cutting surface. The baseboard 12 is formed of a substantially rigid, water proof, non or minimally porous heat resistant durable material, preferably formed from injection molded food-grade plastic which is anti-bacterial and sterilizable. According to an embodiment of the present invention, the baseboard 12 can be formed from a variety of different materials which are approved for use in food industry (such as plastics, acrylic, silicone, polyolefins, e.g., polyethylene and polypropylene, vinyl, olefins, polymers or a laminate of the materials). In another embodiment of the present invention, the baseboard 12 can be made of wood or plastic.

The cutting surface (i.e., the top surface) of baseboard 12 is substantially flat and is configured so as to assist in reducing slippage and to engage and retain articles during the cutting process. The cutting surface of baseboard 12 is preferably pebbled or textured in order to restrict shifting of articles during the cutting process. In an embodiment of the present invention, the cutting surface of baseboard 12 has a matt finish.

The cutting board 10 further includes a cross-sectionally smooth curved sloping surface region (or trough) 16 formed in the cutting surface of the baseboard 12 at one edge. The region 16 is an integral part of the baseboard 12. In an embodiment of the present invention, the region 16 is formed of the same material as the flat cutting surface of the baseboard 12, however, a surface 18 of the region 16 is not textured or pebbled as is the cutting surface of the baseboard 12. According to an embodiment of the present invention, the surface 18 of the region 16 does not possess anti-slip characteristics. In an embodiment of the present invention, the surface 18 of the region 16 is substantially smooth and slippery. The smooth and slippery surface 18 of the region 16 reduces opposing frictional forces while transferring chopped articles from the cutting surface of the baseboard 12 to another location (for example, off the edge of the cutting board). The smooth curved sloping surface 18 of the region 16 provides a trough slide which enhances the transfer of chopped articles from the cutting surface of the baseboard 12 to another location with ease and minimum opposing frictional forces.

As further depicted in FIG. 1, the cutting board 10 comprises an integral upstanding side barrier, guard, or lip 14 extending along the longitudinal edge throughout the entire circumference of the cutting board 10, except in or at the region 16. The side barrier, guard, or lip 14 is designed to prevent food and/or liquid from spilling off the edges of the cutting board 10.

According to an embodiment of the present invention, the cutting board 10 is substantially rectangular in shape. However, the cutting board 10 can be any geometric shape so long as it is sized to accommodate the article to be cut or supported (such as hexagonal, octagonal, circular, oval, triangular, rhomboidal etc.).

Figure 2:
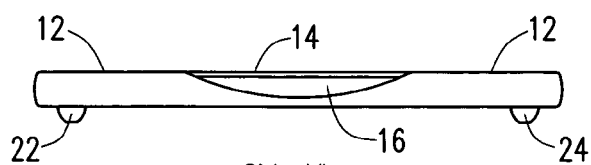
FIG. 2 is a side elevation view of the cutting board of FIG. 1 showing the smooth curved sloping surface region in accordance with the present invention.

FIG. 2 illustrates a side elevation view of the cutting board 10 of FIG. 1 showing the edge location and shape of the region 16. The region 16 has a concave, continuous arch shape (which is cross-sectionally smooth curved) whose depth from the top surface of the baseboard 12 to the bottom or base of the arch gradually decreases as it extends further into the baseboard 12 from the edge so as to define the trough slide. The arch can be of any selected suitable geometry including, for example, circular, parabolic or hyperbolic or other conic shape. According to the present invention, the region 16 provides an outlet through which chopped articles can easily be guided into a sink or any other suitable location from the cutting surface of the baseboard 12. Preferably, the surface of the region 16 is substantially smooth and does not possess anti-slip characteristics.

FIG. 2 further illustrates a plurality of feet 22 and 24. The feet 22 and 24 support and elevate the cutting board 10 above a countertop. A detailed illustration of the feet 22 and 24 (and 26 and 28) of the cutting board 10 is shown with reference to FIGS. 4 and 5.

Figure 4:
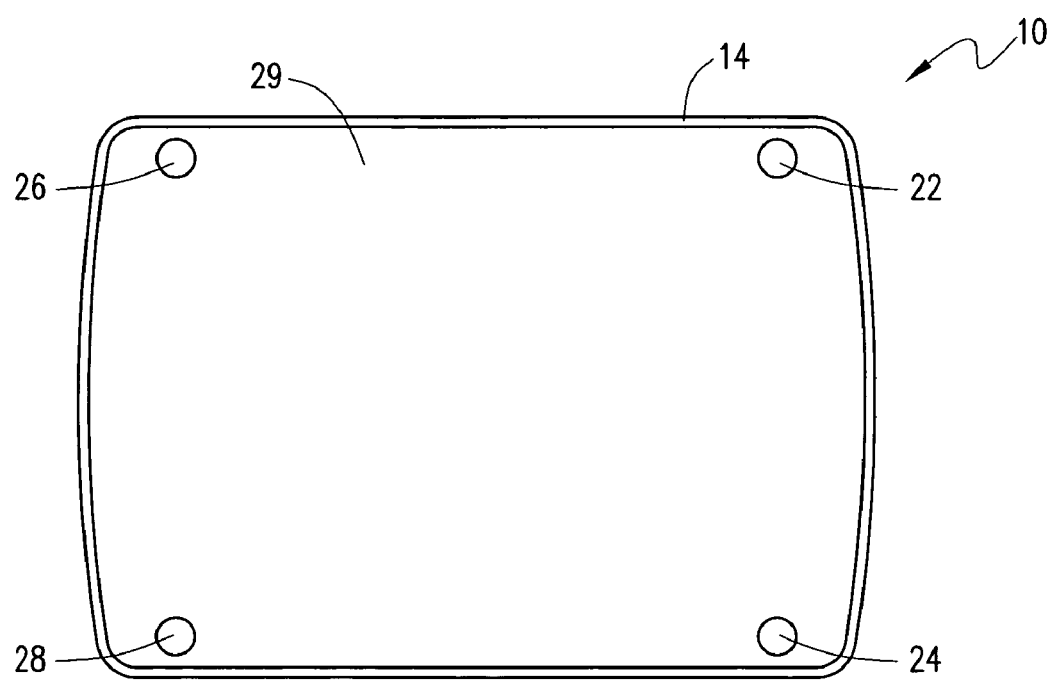
FIG. 4 shows a bottom surface view of the cutting board in accordance with the present invention.

FIG. 4 illustrates a bottom plan view of an underside 29 of the cutting board 10. The cutting board comprises a plurality of feet 22, 24, 26 and 28 having substantially flat bottoms, preferably integrated and directed downwardly from the underside 29 of the baseboard 12. The feet 22, 24, 26 and 28 elevates the underside 29 of the cutting board 10 above the typical standard expected heights of lip portion of a drop in sink. According to an exemplary embodiment of the present invention, there are four feet 22, 24 and 28 which are situated and spatially arranged uniformly over the four corners of the underside 29 of the cutting board 10 in a manner that provides stability and sufficient height. In an embodiment of the present invention, the feet 22, 24, 26 and 28 are preferably flat topped, cubic, truncated cone, pyramidical columnar, cylindrical or other three-dimensional geometric or free form shapes, configurations and dimensions to elevate the baseboard off the support surface while providing support and traction.

Figure 5:
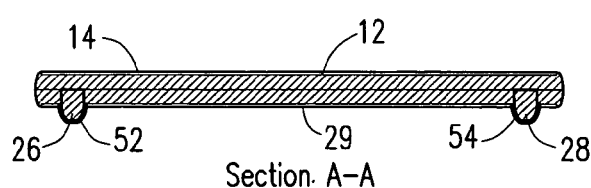
FIG. 5 is a cross-sectional view taken along lines A—A of FIG. 1.

FIG. 5 illustrates a cross-sectional view taken along lines A—A of FIG. 1. In this view the cross section is taken of the cutting board 10 along the baseboard 12. FIG. 5 provides a detailed illustration of the feet 26 and 28 emanating from the underside 29 of the baseboard 12. An elastomeric material is injected onto the integrated feet 26 and 28 to create an overmold. In a preferred embodiment of the present invention, the feet 26 and 28 are molded with a flexible material, such as plastics, polyolefines e.g., polyethylene and polypropylene, silicone, vinyls, or natural or synthetic rubber. The feet 26 and 28 preferably extend out to and along the edges of the cutting board 10 to provide enhanced stability of the cutting board 10. The feet 26 and 28 also are capable of frictionally adhering to a countertop or other surfaces with sufficient drag or gripping ability as to prevent sliding or slipping of the cutting board 10. In a preferred embodiment of the present invention, the feet 26 and 28 have flat bottoms 52 and 54, respectively. The flat bottoms 52 and 54 provide more traction to the cutting board 10 are therefore preferred. In an exemplary embodiment of the present invention, only feet 26 and 28 have been described. However, feet 22 and 24 (FIG. 4) are substantially the same.

The plurality of feet at the underside 29 of the cutting board 10 provides more physical support of the cutting board 10 during forceful cutting. Additionally, it is important that the height of the feet is such that they elevate the cutting board 10 sufficiently above the countertop or any other support surface.

With reference to FIGS. 1 and 2, the manner of using the cutting board will now be described. The cutting surface of the baseboard 12 is raised up above the countertop by means of the feet 22, 24, 26 and 28. The feet 22, 24, 26 and 28 are made of a non-slip material and possess sufficient surface contact area to adequately grip the countertop or other support surfaces to avoid slippage of the cutting board 10 on wet surfaces. The articles to be cut are placed on the cutting surface of the baseboard 12. A sharp instrument, like a knife or a cleaver is utilized for cutting the articles on the baseboard. The cutting surface of the baseboard 12 is configured so as assist in reducing slippage and to engage and retain articles cut during the cutting process.

According to an embodiment of the present invention, the sliced or chopped articles can be guided off or transferred from the cutting surface of the baseboard 12 by means of sliding the chopped articles to and through the region 16. The region 16 possesses a smooth and/or gloss surface which makes the transfer of chopped articles into a sink or any other location with minimum resistance or frictional forces. This simplicity and ease of transferring contents from the cutting surface of the baseboard 12 by simply sliding the contents into the sink utilizing the region 16 represents a marked and novel improvement over present cutting boards.

The cutting board 10 is not screwed, nailed or otherwise anchored to the countertop or other fixed surfaces, so that the cutting board 10 can be easily lifted from the supporting surface when the need is satisfied or work is finished. The cutting board 10 can then be cleaned by hand or in a dishwasher. Additionally, the cutting board 10 requires no disassembly and can be easily stored or transported to the desired location.

Figure 3:
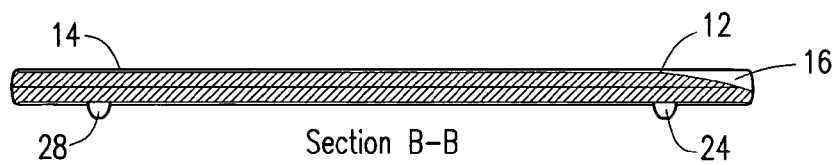
FIG. 3 is a cross-sectional view taken along lines B—B of FIG. 1.

FIG. 3 illustrates a cross-sectional view taken along lines B—B of FIG. 1. In this view the cross section is taken of the cutting board 10 along the center of the cutting board 10 and the region 16. FIG. 3 depicts the decreasing depth of the region 16 (for the arch shape from the top surface of the board to the bottom of the arch) as it extends away from the edge so as to define the sloping trough slide.

Figure 6:
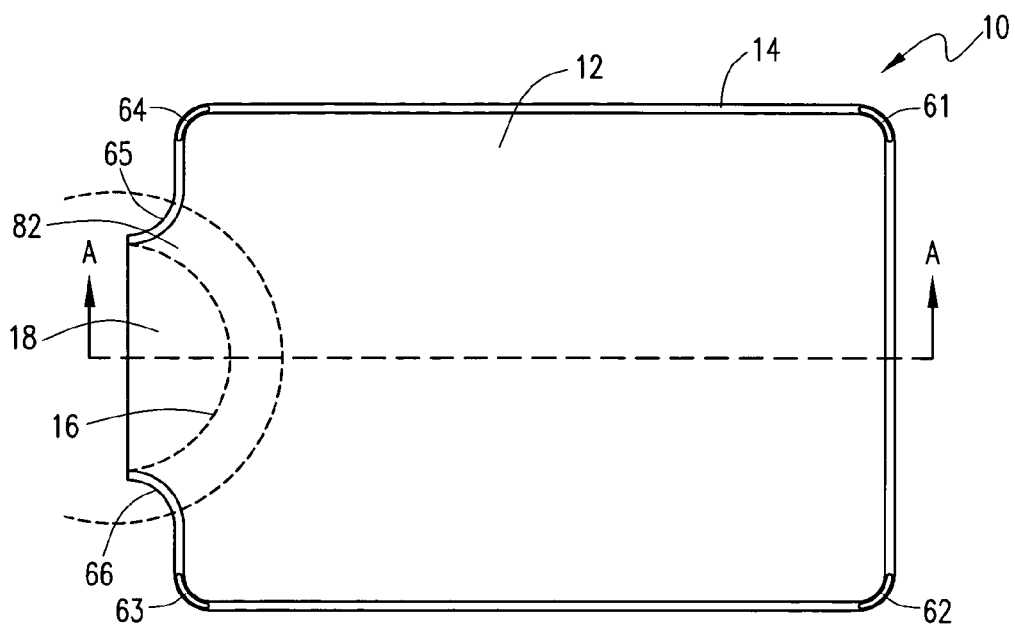
FIG. 6 is top surface view of the cutting board according to an alternate embodiment of the present invention.
Figure 7:
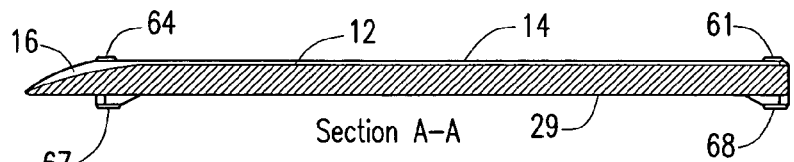
FIG. 7 is a cross-sectional view taken along lines A—A of FIG. 6.
Figure 8:
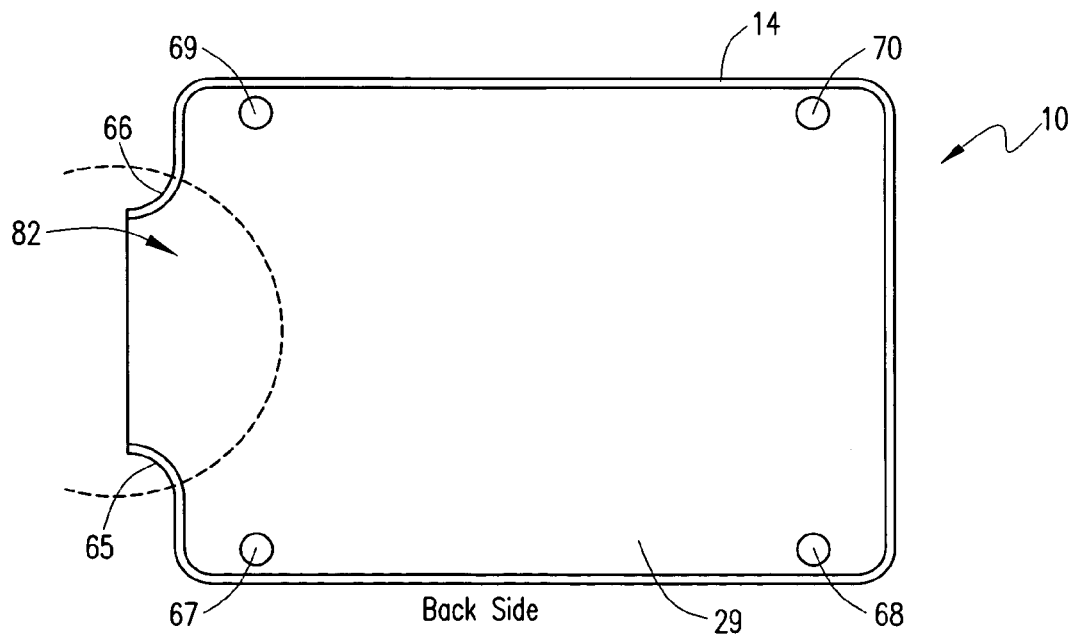
FIG. 8 is a bottom surface view of the cutting board in accordance with the alternate embodiment of the present invention.

Referring now to FIGS. 6–8, an alternative embodiment of the cutting board of the present invention will be described in detail.

FIG. 6 illustrates an alternative embodiment of a cutting board 10 according to the present invention. The cutting board 10 is substantially similar to the one disclosed earlier with reference to FIGS. 1–5, however, one edge of the cutting board 10 is extended to define a spout region 82. The spout region 82 assists in extending the reach of the region 16. The spout region 82 is defined by edge extensions 65 and 66.

According to an embodiment of the present invention, the sliced or chopped articles can be guided off or transferred from the cutting surface of the baseboard 12 by means of sliding the chopped articles to and through the region 16. As disclosed earlier with respect to FIGS. 1–5, the region 16 possesses a smooth and/or gloss surface which makes the transfer of chopped articles into a sink or any another location with minimum resistance or frictional forces.

The cutting board 10 comprises an integral upstanding side barrier, guard, or lip 14 extending along the longitudinal edge throughout the entire circumference of the cutting board 10 except the region 16. The side barrier, guard, or lip 14 is designed to prevent food and/or liquid from spilling off the edges of the cutting board 10.

The cutting board according to the present invention can be used for chopping articles utilizing the cutting surface of the baseboard 12 or an underside 29 of the cutting board 10. In an exemplary embodiment of the present invention, the cutting board 10 can be flipped such that the cutting surface of the baseboard 12 as well as the underside 29 can be used for chopping articles.

As further depicted in FIG. 6, the cutting board 10 comprises a plurality of projections 61, 62, 63 and 64 having substantially flat bottoms. The plurality of projections 61, 62, 63 and 64 are situated and spatially arranged uniformly over the four corners and mounted on the barrier, guard, or lip 14. The purpose of the projections 61, 62, 63 and 64 is to support and elevate the cutting board 10 when the underside 29 is used for cutting purposes. When the cutting board 10 is flipped such that the underside 29 is used as the cutting surface, the cutting board 10 works like any other cutting board 10 and does not possess the smooth curved sloping surface region 16 for the transfer of chopped articles.

FIG. 7 illustrates a cross-sectional view taken along lines A—A of FIG. 6. In this view, the cross section is taken of the cutting board 10 along the center of the cutting board 10 and the region 16. FIG. 7 depicts the decreasing depth of the region 16 (for the arch shape from the top surface of the board to the bottom of the arch) as it extends away from the edge so as to define the sloping trough slide. FIG. 7 further illustrates a plurality feet 67 and 68 emanating from the underside 29 of the baseboard 12. An elastomeric material is injected onto the integrated feet 67 and 68 to create an overmold. The feet 67 and 68 preferably extend out to and along the edges of the cutting board 10 to provide enhanced stability of the cutting board 10. The feet 67 and 68 also are capable of frictionally adhering to a countertop or other surfaces with sufficient drag or gripping ability as to prevent sliding or slipping of the cutting board 10. In an exemplary embodiment of the present invention, only feet 67 and 68 have been described. However, feet 69 and 70 (FIG. 8) are substantially the same. FIG. 7 further illustrates projections 61 and 64 which provide stability, support and sufficient height to the cutting board 10 when the underside 29 is used for cutting purposes.

FIG. 8 illustrates a bottom plan view of the underside 29 of the cutting board 10. The cutting board comprises a plurality of feet 67, 68, 69 and 70 having substantially flat bottoms, preferably integrated and directed downwardly from the underside 29 of the baseboard 12. The feet 67, 68, 69 and 70 elevates the underside 29 of the cutting board 10 above the typical standard expected heights of lip portion of a drop in sink. According to an exemplary embodiment of the present invention, there are four feet 67, 68, 69 and 70 which are situated and spatially arranged uniformly over the four corners of the underside of the cutting board 10 in a manner that provides stability and sufficient height. In an exemplary embodiment of the present invention, the underside 29 is also used for cutting purposes.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cutting board comprising:
   a baseboard having a cutting surface for cutting articles thereon; and
   a sloping trough slide defined in the cutting surface from an interior point to an edge of the baseboard, the slide having a concave, continuous arch shape that decreases in depth as the slide extends in from the edge to the interior point.

2. The cutting board of claim 1, further comprising a lip extending along a longitudinal edge throughout an entire perimeter of the cutting board except the edge where the slide is located.

3. The cutting board of claim 2, further comprising a plurality of projections arranged uniformly over a plurality of corners and mounted on the lip.

4. The cutting board of claim 1, wherein the cutting surface possesses an anti-slip characteristic.

5. The cutting board of claim 4, wherein the cutting surface is textured.

6. The cutting board of claim 4, wherein the cutting surface is pebbled.

7. The cutting board of claim 4, wherein the cutting surface has a matt finish.

8. The cutting board of claim 1, wherein a surface of the slide has a texture which is different from a texture of the cutting surface.

9. The cutting board of claim 8, wherein the texture of the surface for the slide is substantially smooth.

10. The cutting board of claim 8, wherein the texture of the surface for the slide is substantially slippery.

11. The cutting board of claim 8, wherein the surface of the slide has a gloss finish.

12. The cutting board of claim 1, wherein the baseboard is formed from a water proof, non or minimally porous, heat resistant durable material.

13. The cutting board of claim 12, wherein the baseboard is formed from an injection molded food-grade plastic.

14. The cutting board of claim 13, wherein the food-grade plastic is anti-bacterial and sterilizable.

15. The cutting board of claim 12, wherein the baseboard is formed from polyolefin.

16. The cutting board of claim 12, wherein the baseboard is formed from polyethylene.

17. The cutting board of claim 1, wherein the baseboard has a geometric shape.

18. The cutting board of claim 17, wherein the baseboard has a substantially rectangular shape.

19. The cutting board of claim 1, further comprising a bottom surface on which the cutting board is adapted to be supported during cutting.

20. The cutting board of claim 19, wherein the bottom surface comprises a plurality of feet.

21. The cutting board of claim 20, wherein the plurality of feet are situated near a plurality of corners of the bottom surface.

22. The cutting board of claim 20, wherein the plurality of feet are integrally connected to an underside of the bottom surface.

23. The cutting board of claim 20, wherein an elastic material is injected into the plurality of feet to create an overmold.

24. The cutting board of claim 1, further comprising a spout region; and
    wherein the sloping trough slide is defined in the cutting surface at the spout region.

25. The cutting board of claim 24, wherein the spout region assists in extending a reach of the sloping trough slide.

26. A cutting board comprising:
    a baseboard having a cutting surface for cutting articles thereon and a spout region at one edge thereof; and
    a sloping trough slide defined in the cutting surface from an interior point in the spout region to the edge of the baseboard, the slide having a concave, continuous arch shape that decreases in depth as the slide extends in from the edge to the interior point.

27. The cutting board of claim 26, wherein the spout region assists in extending a reach of the sloping trough slide.

28. A cutting board comprising:
    a baseboard having a cutting surface for cutting articles thereon and a cross-sectionally smooth sloping trough defined in the cutting surface from an interior point extending in from an edge of the baseboard to the interior point.

29. The cutting board of claim 28, further comprising a spout region; and
    wherein the sloping trough is defined in the cutting surface at the spout region.

30. The cutting board of claim 29, wherein the spout region assists in extending a reach of the sloping trough.

* * * * *